(12) United States Patent
Weber (10) Patent No.: US 10,274,301 B2
(45) Date of Patent: Apr. 30, 2019

(54) CONTOUR METER AND METHOD FOR MEASURING THE CONTOUR OF A WORKPIECE HAVING TANGENTIALLY ADJOINING CONTOUR GEOMETRIES

(75) Inventor: Hero Weber, Oldenburg (DE)

(73) Assignee: Carl Mahr Holding GmbH, Goettingen (DE)

( * ) Notice: Subject to any disclaimer, the term of this patent is extended or adjusted under 35 U.S.C. 154(b) by 968 days.

(21) Appl. No.: 14/232,158

(22) PCT Filed: Jul. 4, 2012

(86) PCT No.: PCT/EP2012/063021
§ 371 (c)(1),
(2), (4) Date: Apr. 10, 2014

(87) PCT Pub. No.: WO2013/007569
PCT Pub. Date: Jan. 17, 2013

(65) Prior Publication Data
US 2014/0249775 A1    Sep. 4, 2014

(30) Foreign Application Priority Data

Jul. 13, 2011 (DE) .......................... 10 2011 051 800

(51) Int. Cl.
*G01B 5/20* (2006.01)
*G01B 21/04* (2006.01)
*G01B 21/20* (2006.01)

(52) U.S. Cl.
CPC .............. *G01B 5/20* (2013.01); *G01B 21/04* (2013.01); *G01B 21/20* (2013.01)

(58) Field of Classification Search
CPC .......... G01B 21/04; G01B 5/20; G01B 21/20; G01B 21/045; G01B 5/008
See application file for complete search history.

(56) References Cited

U.S. PATENT DOCUMENTS 7,643,963 B2    1/2010  Noda et al.
7,908,759 B2    3/2011  McLean et al.
(Continued)

FOREIGN PATENT DOCUMENTS

CN    1800777 A    7/2006
CN    1892177 A    1/2007
(Continued)

OTHER PUBLICATIONS

Office action and search report in corresponding Chinese application No. 201280034682.7, dated Aug. 15, 2016, 16 pages.
(Continued)

*Primary Examiner* — Mohamed Charioui
*Assistant Examiner* — Eyob Hagos
(74) *Attorney, Agent, or Firm* — Fitch, Even, Tabin & Flannery LLP (57) ABSTRACT

A workpiece contour (13) at least first and second contour geometries (K1-K2) adjoining one another tangentially at a first transition point (U1). Measurement points (M) are recorded along the geometries (K1-K2). Using some measurement points within the first geometry (K1), a first replacement element (G1) is determined and assigned to the first geometry (K1). Analogously, using some measurement points (M) of the second geometry (K2) a second geometry element (G2) assigned to the latter is determined. The size and/or the position of the second geometry element (G2) are calculated under the boundary condition that the second replacement element (G2) adjoins the first replacement element (G1) tangentially. The tangential transition point between the two replacement elements (G1), (G2) forms the first transition point (U1). This method can be iterated using additional or other measurement points (M), until the first transition point (U1) is determined with sufficient accuracy.

13 Claims, 4 Drawing Sheets

(56) References Cited

U.S. PATENT DOCUMENTS

| | | | |
|---|---|---|---|
| 8,978,261 B2 * | 3/2015 | McFarland | G01B 21/045 33/503 |
| 2006/0290947 A1 * | 12/2006 | Li | G01B 11/24 356/625 |
| 2007/0005295 A1 * | 1/2007 | Dusserre-Telmon | G01B 21/20 702/167 |
| 2009/0307916 A1 * | 12/2009 | McLean | G01B 21/04 33/503 |
| 2009/0319224 A1 * | 12/2009 | Jackson | G01B 21/20 702/167 |
| 2012/0096728 A1 | 4/2012 | Reitemeyer et al. | |
| 2014/0249775 A1 | 9/2014 | Weber | |

FOREIGN PATENT DOCUMENTS

| | | |
|---|---|---|
| CN | 101762259 A | 6/2010 |
| CN | 10166951 B | 9/2011 |
| CN | 101166950 B | 5/2012 |
| DE | 19600002 A1 | 7/1996 |
| DE | 19914862 A1 | 10/2000 |
| DE | 10258493 A1 | 7/2004 |
| DE | 102007016502 A1 | 10/2008 |
| DE | 102007044000 A1 | 4/2009 |
| DE | 102008021304 A1 | 10/2009 |
| DE | 112006003100 T5 | 6/2010 |
| DE | 102009020294 A1 | 11/2010 |
| JP | S5988615 A | 5/1984 |
| JP | 10311710 A | 11/1998 |
| JP | H11211452 A | 8/1999 |
| JP | 2008116392 A * | 5/2008 |
| JP | 2008241420 A | 10/2008 |
| JP | 2010210576 A | 9/2010 |
| JP | 2014522978 A | 9/2014 |
| WO | 2010127930 A1 | 11/2010 |

OTHER PUBLICATIONS

Office action in corresponding Japanese application No. 2014-519498, dated Oct. 13, 2016, 4 pages.
Office action in corresponding German application No. 102011051800.2, dated Nov. 18, 2011, 8 pages.
International Search Report, International Application No. PCT/EP2012063021; dated Oct. 15, 2012, 6 pages.
Office action and search reporting in corresponding Chinese Application No. 201280034682.7, dated Oct. 23, 2015, 15 pages.
Office action and search reporting in corresponding Japanese Application No. 2014-519498, dated Nov. 20, 2015, 23 pages.

* cited by examiner

CONTOUR METER AND METHOD FOR MEASURING THE CONTOUR OF A WORKPIECE HAVING TANGENTIALLY ADJOINING CONTOUR GEOMETRIES

CROSS REFERENCE TO RELATED APPLICATIONS

This patent application is the national phase of PCT/EP2012/063021 filed Jul. 4, 2012, which claims the benefit of German Patent Application No. DE 102011051800.2 filed Jul. 13, 2011.

TECHNICAL FIELD

The instant invention relates to a contour meter as well as to a method for measuring the contour.

BACKGROUND

The contour of a workpiece is thereby measured two-dimensionally or, in the alternative, also three-dimensionally. The contour meter encompasses a sensor for measuring measurement points along the workpiece contour, which is to be measured. The sensor can operate in a tactile or contact-free manner, for example optically. For example, a stylus instrument, which encompasses a measuring sensor, which is moved along a predetermined path of the contour, which is to be measured, can serve as contour meter. A stylus instrument is known, e.g. from DE 10 2009020 294 A1.

In the alternative, the contour can also be measured by means of a contour meter, which encompasses image processing, as it is known from DE 2007 016 502 A1, for example. The contour of the workpiece, which is to be measured, is thereby recorded by means of a camera. The contour of the workpiece is then determined via image processing. For this purpose, DE 10 2007 016 502 A1 proposes to initially configure the measuring task. The measuring range is thereby determined and a tool model is assigned to the measuring range.

When measuring the contour, in particular when using a measuring sensor, which is moved along the workpiece contour, it turned out that it is difficult to determine the transition points between two contour geometries, at which the contour geometries adjoin one another tangentially. This can be a tangential transition between two circular arc-shaped contour geometries or the tangential transition between a straight contour geometry and a circular arc-shaped contour geometry, for example. When measuring the workpiece contour, it is very difficult to determine the transition point to a sufficiently accurate extent. This, in turn, has the result that it is difficult to determine, whether the tangential transition was made with the desired accuracy in response to the production of the workpiece.

SUMMARY

It can thus be considered to be a task of the instant invention to create a contour meter, in particular a stylus instrument, and a method for measuring the contour, which provides for a more accurate determination of transition points, at which two contour geometries of the workpiece contour, which is to be measured, adjoin one another tangentially.

This task is solved by means of a method comprising the features of patent claim 1 as well as by means of a contour meter comprising the features of patent claim 13.

Initially, the workpiece contour, which is to be measured, is measured in a single measuring movement along the first contour geometry and the second contour geometry, wherein a multiplicity of measurement points are measured. By means of the recoded measurement points, the different contour geometries can then be differentiated. A replacement element is then assigned to each identified contour geometry. In the event that the measurement points, which are measured in a contour geometry, are located on a circular arc, a circle is assigned to this contour geometry as replacement element. In the event that the measurement points are located on a straight line within a contour geometry, a straight line is assigned to this contour geometry. Due to the fact that the first transition point between the first contour geometry and the second contour geometry is not yet known, only those measurement points, which encompass a sufficient minimum distance to the measurement points of the transition point, and in particular to the measurement points, which were used for determining the replacement elements of the adjoining contour geometry, are used in a preferred exemplary embodiment for determining the respective replacement element.

The position and/or the size of the first replacement element and/or of the second replacement element is subsequently determined under the boundary condition that the first and the second replacement element adjoin one another tangentially at the transition point. For example, a circle or a straight line is initially determined as first replacement element. For example, a circle is subsequently calculated as second replacement element under the condition that said circle tangentially adjoins the previously determined first replacement element. The tangential connection point then represents the first transition point between the first contour geometry and the second contour geometry.

In particular in the case of radii, which only extend along a small angular segment, the method according to the invention improves the reproducibility of the results considerably.

The calculation of the position of the first transition point is preferably repeated iteratively, so as to increase the accuracy. Other or additional measurement points can thereby be used in each iteration step within a respective contour geometry to calculate the assigned replacement element. Preferably, the iterative calculation of the position of the first transition point is ended when a position change between two consecutive position determinations of the first transition point is smaller than a predetermined modified threshold value. In the alternative, the number of the iterations could also be provided.

The workpiece, which is to be measured, can also encompass three or more contour geometries, wherein two adjacent contour geometries in each case adjoin one another tangentially. Preferably, the first replacement element of a first contour geometry and the third replacement element of a third contour geometry are determined hereby. The position and/or the size of a second replacement element, which is located therebetween, is subsequently calculated such that the second replacement element adjoins tangentially to the first replacement element and to the third replacement element. The calculation of the second replacement element therefore takes place in consideration of two boundary conditions.

In response to the determination of an auxiliary geometry element, it is further advantageous when only measurement points are used, which encompass a minimum distance from the transition point or from the measurement points, which are used to calculate the adjacent replacement element, respectively. The minimum distance can thereby be variable and can be reduced, when the accuracy of the position determination of the transition point between two contour geometries increases as a function of the number of the iterative position determination of the respective transition point, which already took place. In the case of subsequent iterative position calculations of the respective transition points, it is also possible to consider those measurement points, which could not yet be used in response to an earlier calculation.

A target contour of the workpiece can be determined by means of the calculated replacement elements. Depending on the target contour, the deviation of the actual contour of the workpiece, which is actually measured via the measurement points, from the target contour can be determined and can be displayed graphically to the user, for example via a display device of the contour meter.

It is also possible to use the method according to the invention in the case of flat tangential transitions between two adjacent flat contour geometries. A flat contour geometry can be formed by a section of a cylindrical jacket surface or a plane, for example. When measuring the contour, a plurality of linear measurements is carried out to measure the surface. The tangential transition can take place, for example, between a plane and a section of a cylindrical jacket surface or between two adjoining sections of two cylindrical jacket surfaces. The transition point is determined analogously to the above-described methods.

To calculate a circle as replacement element, the "method of least squares" can be used. In the alternative, it is also possible to determine a circle as replacement element by means of other mathematical criteria, such as, e.g., bounding criteria (circular boundary, thus the smallest circumscribed circle), inscribing criteria (inscribed circle, thus the largest inscribed circle) or minimum criteria (minimum or Tschebyscheff circle comprising the smallest surface). Via this replacement circle determination and the auxiliary condition of tangentially adjoining replacement elements, the transition point can be determined therefrom.

Advantageous embodiments of the invention follow from the dependent patent claims and from the description. The description explains the invention by means of preferred exemplary embodiments and is limited to significant features of the invention and to other conditions. The drawing is to be used in a supplementary manner.

DETAILED DESCRIPTION

Figure 1:
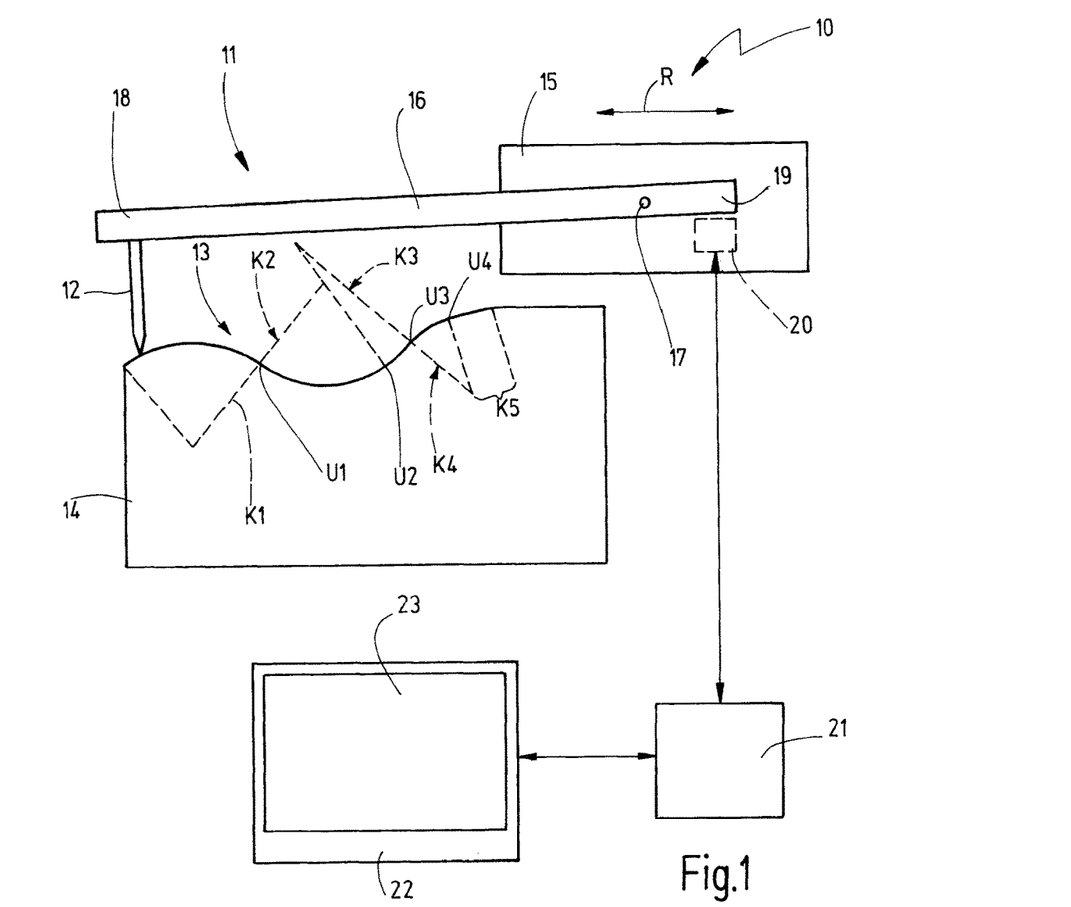
FIG. 1 shows an exemplary embodiment of a contour meter in a schematic, block diagrammatic illustration.

A block diagram of a contour meter 10 is illustrated in FIG. 1 in an extremely simplified manner. The contour meter 10 encompasses a sensor 11 comprising a measuring sensor 12, which can be moved along the workpiece contour 13 for measuring a workpiece contour 13 of a workpiece 14. In the case of the exemplary embodiment, the contour meter 10 is embodied as a stylus instrument. The contour meter 10 has a carriage 15, which can be moved linearly in a measuring direction R and on which a sensing arm 16 is supported so as to be pivotable about a pivot axis 17. Starting at the pivot axis 17, the sensing arm 16 extends towards its first end 18, at which the measuring sensor 12 is arranged. On its second end 19, which is located opposite the first end 18, a measuring sensor 20, which measures the pivot position of the sensing arm 16 about the pivot axis 17, is assigned to the sensing arm 16. The measuring values of the measuring sensor 20 are transmitted to a control device 21. The control device 21 is connected to an operating unit 22. The operating unit 22 comprises input means and/or output means as control interface to an operator. In the case of the exemplary embodiment, the output means include a display device 23, for example a display.

The control device 21 is equipped to carry out the method according to the invention for measuring the contour. A preferred procedure is illustrated in the flow chart according to FIG. 6 and is explained below with reference to FIGS. 2 to 5.

Figure 6:
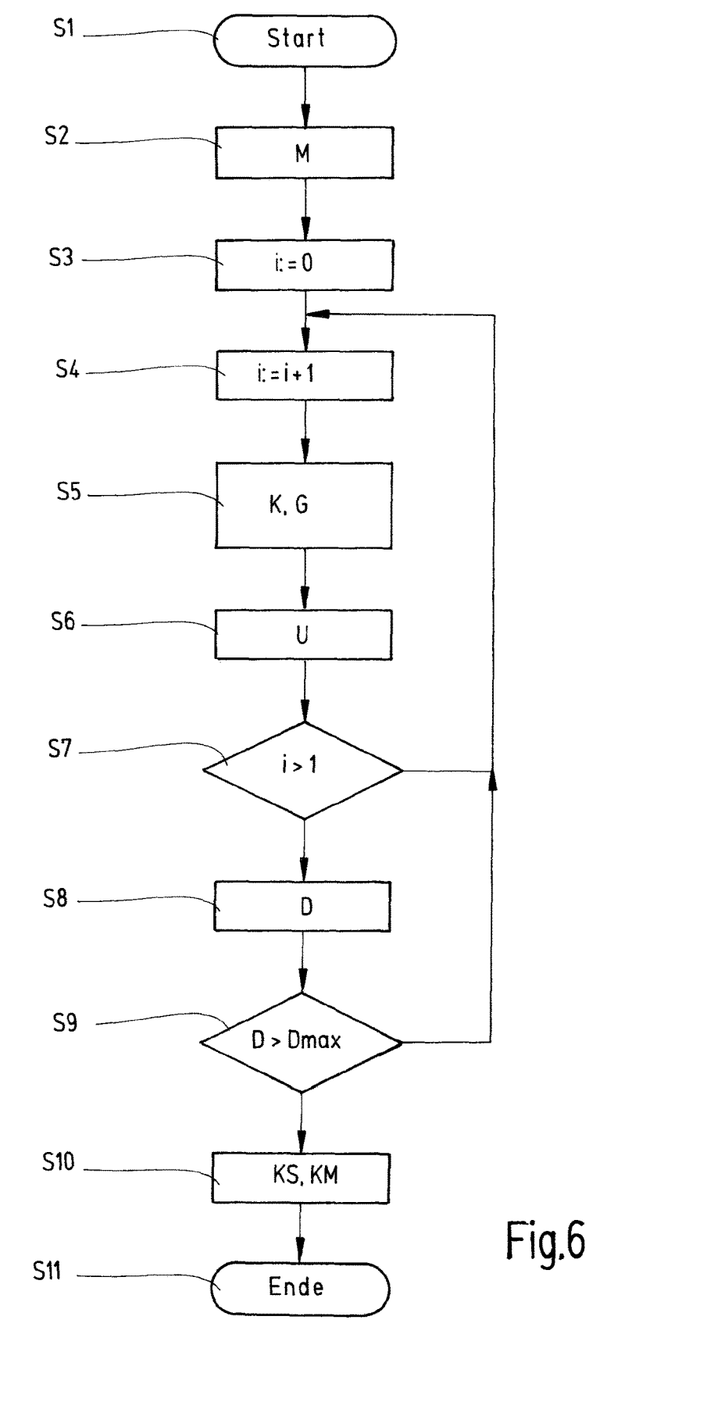

For measuring the workpiece contour 13, a workpiece 14 is clamped into a clamping device of the contour meter 10. The method for measuring the contour is subsequently started in a first method step S1. In the case of the exemplary embodiment, the measuring sensor 12 is moved along the workpiece contour 13 in a second method step S2.

Figure 2:
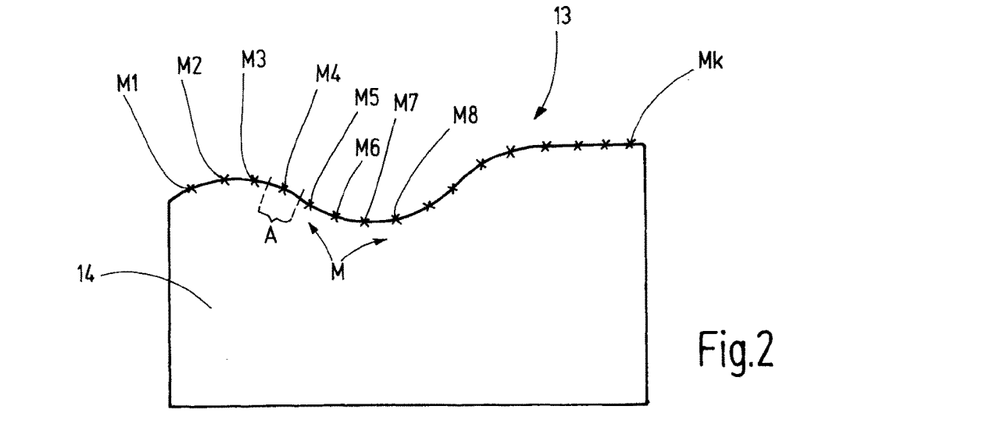
FIG. 2 shows measurement points recorded in response to a method for measuring the contour, along a workpiece contour, which is to be measured, in an exemplary, schematic illustration, which is not true to scale.

For this purpose, the carriage 15 is displaced in measuring direction R. The sensing arm 16 is deflected about the pivot axis 17 as a function of the course of the contour, which the measuring sensor 20 measures and transmits to the control device 21. A multiplicity of measurement points M is measured in this manner along the workpiece contour 13, as it is illustrated in FIG. 2 in an extremely schematic manner. According to the example, k measurement points M1 to Mk are measured along the workpiece contour 13.

According to the example, a counter variable i is subsequently set to zero in a third method step S3 and is incremented by one in a subsequent fourth method step S4.

Adjoining contour geometries K of the workpiece contour 13 are determined by means of the determined measurement points M in the subsequent fifth method step S5, wherein five contour geometries K1 to K5 are illustrated schematically in the case of the workpiece 14, which is illustrated schematically herein. The number of the contour geometries depends on the workpiece 14 and is arbitrary on principle.

The workpiece 14 encompasses a target contour K5, in the case of which the contour geometries K adjoin one another tangentially at transition points U. The first contour geometry K1 adjoins tangentially to a second contour geometry K2 at a first transition point U1. The second contour geometry K2, in turn, adjoins tangentially to the third contour geometry K3 at a second transition point U2, etc. The number of these transition points U, at which two adjacent contour geometries K adjoin one another tangentially in each case, depends on the workpiece 14 and is arbitrary on principle. A tangential transition can take place, for example, between two contour geometries, which are contoured in a circular arc-shaped manner, as is illustrated in an exemplary manner at the first transition point U1 or the second transition point U2 in the case of the exemplary embodiment described herein. A tangential transition can also take place between a contour geometry, which runs straight, and a contour geometry, which runs in a circular arc-shaped manner, as it is illustrated at the fourth transition point U4 between the fourth contour geometry K4 and the fifth contour geometry K5.

In the fifth method step S5, the positions of the transition points U are still unknown. However, it can be identified by means of the measurement points M, whether the assigned contour geometry K runs along a circular arc or along a straight line. In the fifth method step S5, a replacement element G is in each case assigned to each contour geometry K. This assignment is illustrated schematically in FIG. 3.

Figure 3:
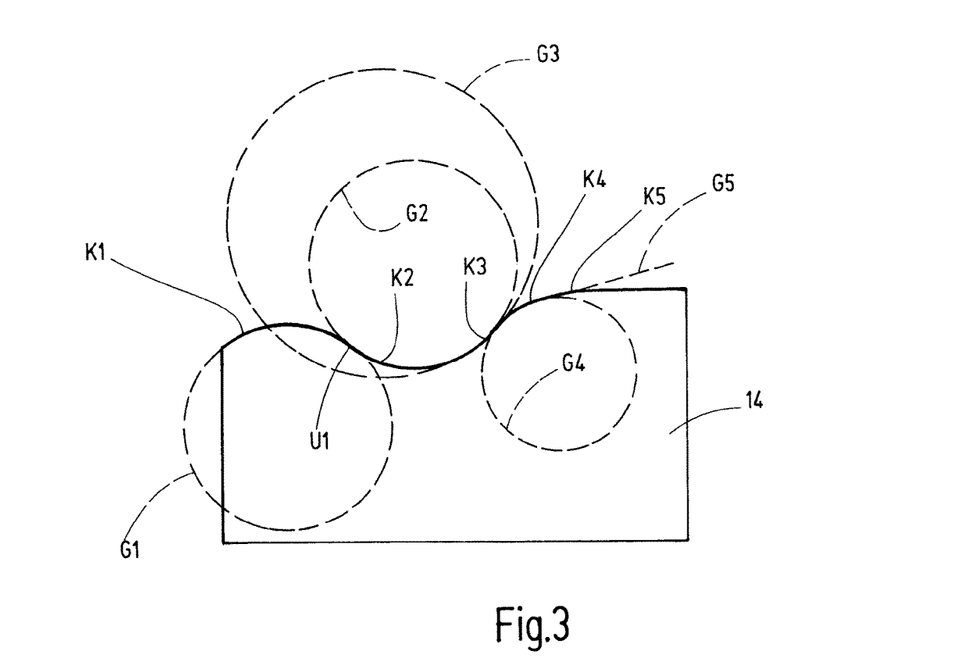
FIG. 3 shows the replacement elements calculated by means of the identified contour geometries.

It is determined, for example, by means of the measurement points M1 to M3 that the contour of the first contour geometry K1 extends along a circular arc. A circle is thus assigned to the first contour geometry K1 as first replacement element G1. Likewise, it is determined, for example by means of the measurement points M5, M6 and M7 that the second contour geometry K2 also extends along a circular arc, so that a circle is also assigned to the second contour geometry K2 as second replacement element G2. A circle is in each case also assigned to the third contour geometry K3 and to the fourth contour geometry K4 as third replacement element G3 and as fourth replacement element G4. The fifth contour geometry K5 extends in a straight line, so that a straight line is assigned to the fifth contour geometry K5 as fifth replacement element G5.

Due to the fact that the position of the transition points U1 to U4 is still unknown in this fifth method step S5, only those measurement points M, which encompass a minimum distance A to the measurement points M, which are used to determine the replacement element G for the adjacent contour geometry K, are used in response to the decision, which replacement element is assigned to a contour geometry K1 to Kx. This is illustrated in a highly schematic manner in FIG. 2. The fourth measurement point M4, for example, is not considered in the fifth method step S5, because it does not encompass the necessary minimum distance A to the third measurement point M3 and to the fifth measurement point M5. The third measurement point M3 was used to determine the first geometry element and the fifth measurement point M5 was used to determine the second replacement element G2. The fourth measurement point M4 does not encompass a sufficient minimum distance to the third measurement point M3 or to the fifth measurement point M5, and is thus not considered when determining the replacement elements G1 and G2.

In the case of a preferred embodiment alternative of the method, the circular second replacement element G2 is calculated such that it merges tangentially into the circular first replacement element G1 or adjoins it, respectively. The point, at which the two adjacent replacement elements G1, G2 merge tangentially, represents the first transition point U1. Likewise, the circular third replacement element G3 can be calculated such that it adjoins tangentially to the second replacement element D2, from which the second transition point U2 follows. This is carried out for all of the replacement elements G1 to G5, which adjoin one another.

As a modification, it is also possible to determine each second replacement element, for example the first replacement element G1, the third replacement element G3 and the fifth replacement element G5 in a first step. The replacement elements G2, G4 located therebetween can then be determined in consideration of two boundary conditions in each case, namely that they tangentially adjoin to the respective adjacent replacement element G1, G3 or G3, G5, respectively.

The transition points U, at which the contour geometries K adjoin one another tangentially, are determined in this manner in a sixth method step S6.

This first calculation of the transition points U, however, is not accurate enough on principle. In the case of the preferred exemplary embodiment, the accuracy of the calculation of the transition points U is thus increased iteratively. For this purpose, it is initially queried in a seventh method step S7, whether it is the first calculation of the transition points U. For this purpose, it is checked, whether the cell variable i is greater than 1. If this is not the case (branching N), the fourth method step S4 is returned to. In the alternative, the method is continued in the eight method step S8 (branching Y).

The position deviation D between two subsequent iterations is calculated for each transition point U in the eight method step S8. It is then queried in a subsequent ninth method step S9, whether the position deviation D is greater than a predetermined modified threshold value Dmax. If this is the case (branching Y), the fourth method step S4 is returned to. In the alternative, the method is continued in a tenth method step S10.

In the event that the fourth method step S4 is returned to in the seventh method step S7 or in the ninth method step S9, a new iteration of the calculation of the position of the transition points U takes place in the method steps S5 and S6. Additional or other measurement points M are thereby used for determining the replacement elements than are used in the preceding calculation iterations. In this manner, the accuracy of the calculation of the transition points U can be increased in this manner, in the case of each iteration loop.

Once a sufficient accuracy has finally been reached, this is identified in the case of the preferred exemplary embodiment in that the determined position of the transition points U only changes slightly in two subsequent calculation iterations and the position change D is smaller than a predetermined modified threshold value Dmax. It is also possible that the number of the iterations has different sizes for the calculation of the position of different transition points U1, U2, U3, U4, so as to reach the desired accuracy.

In the event that a sufficient accuracy of the position determination was identified for all transition points U (branching N from the ninth method step S9), the measuring result is output in the tenth method step S10 via the display device 23. In the case of the exemplary embodiment, the measurement result consists of a target contour K5 of the workpiece contour 13, which is determined by means of the replacement elements G, which adjoin one another at the transition points U. In addition to this target contour K5, the actual contour KM, which is measured by means of the measurement points M, is also output. The deviation between the target contour K5 and the actual contour KM can then also be seen from this.

Figure 5:
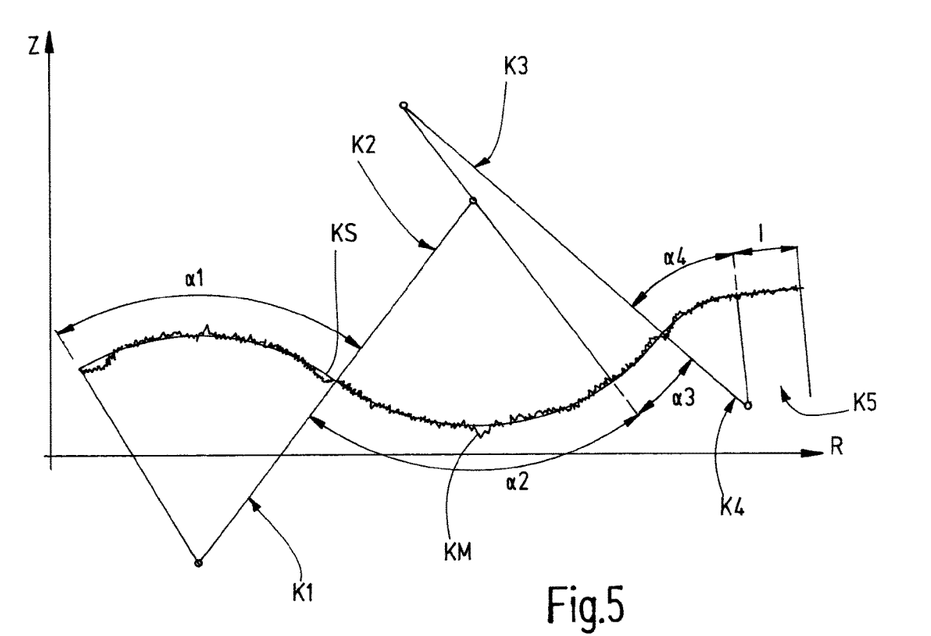
FIG. 5 shows the results of the contour measurements of a workpiece contour by means of the method according to the invention and FIG. 6 shows the flow chart of an exemplary embodiment of a method according to the invention for measuring the contour.

An example for a graphic illustration for displaying the measuring result is illustrated in FIG. 5. The height z is specified therein at a right angle to the measuring direction R across the path in measuring direction R. The transition points U between two contour geometries K, which adjoin one another tangentially, are also illustrated. In addition, circular arc angles α or lengths l can also be illustrated.

Figure 4:
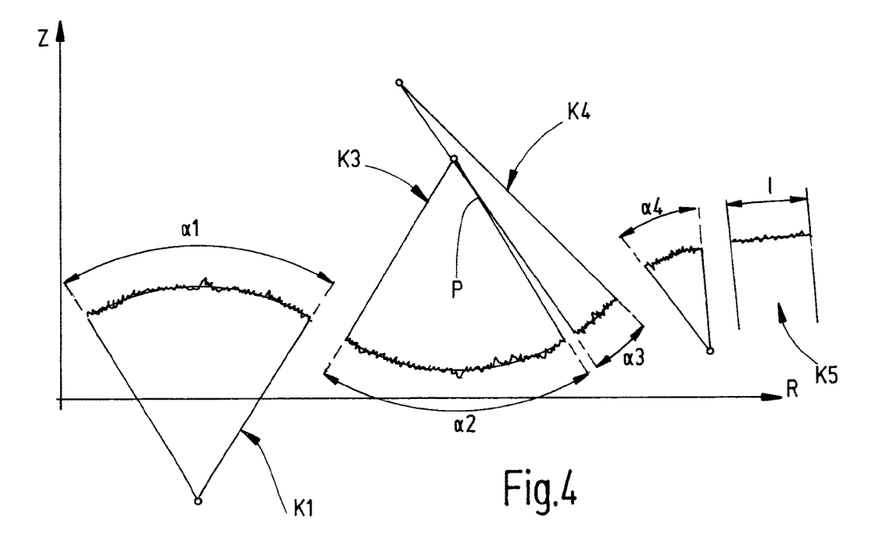
FIG. 4 shows the illustration of the results of a contour measurement by means of a method according to the state of the art.

For comparison purposes, FIG. 4 illustrates the result of an individual measurement of the contour geometries K independent from one another. It can also be seen thereby that the areas at the respective transition points cannot be measured or can only be measured with insufficient accuracy. In the case of this example, the radial lines of the second contour geometry K2 and of the third contour geometry K3, for example, intersect in an intersection point P, which is not possible in the case of contour geometries K, which adjoin one another tangentially. A comparison of the actual contour KM with the target contour K5 at the transition points U is not possible or is possible only insufficiently in the case of such an individual measurement.

Following the output of the measuring result, the method is ended in an eleventh method step S11.

Laminar tangential transitions between two adjacent flat contour geometries can also be determined in the same manner as a modification to the exemplary embodiment described herein. A flat contour geometry can be formed, for example, by means of a section of a cylindrical jacket surface or of a plane. A plurality of contour measurements, which are offset parallel to one another, are carried out thereby. The tangential transition can take place, for example, between a plane and a second of a cylindrical jacket surface or between two adjacent sections of two cylindrical jacket surfaces.

In the case of a further modification, a point can also be used as replacement element and the tangential connection to this point, for example, can be used as boundary condition for the calculation of a further adjoining replacement element.

The invention relates to a contour meter 10 as well as to a method for measuring the contour of a workpiece contour 13. The workpiece contour 13 encompasses a plurality of contour geometries K. At least a first contour geometry K1 and a second contour geometry K2 adjoin one another tangentially on a first transition point U1. Initially, a multiplicity of measurement points M are measured along the first contour geometry K1 and the second contour geometry K2. Based on a part of the measurement points within the first contour geometry K1, a first replacement element G1 is determined and is assigned to the first contour geometry K1. Based on several measurement points M of the second contour geometry K2, a second geometry element G2, which is assigned to the latter, is determined analogous to this. The calculation of the size and/or of the position of the second geometry element G2 takes place under the boundary condition that the second replacement element G2 adjoins tangentially to the first replacement element G1. The tangential transition point between the two replacement elements G1, G2 forms the first transition point U1, which was determined in this manner. This method can be repeated iteratively with the aid of additional or other measurement points M, until a sufficiently accurate position determination of the first transition point U1 has taken place.

LIST OF REFERENCE NUMERALS 10 contour meter
11 sensor
12 measuring sensor
13 workpiece contour
14 workpiece
15 carriage
16 sensing arm
17 pivot axis
18 first end
19 second end
20 measuring sensor
21 control device
22 operating unit
23 display device
A minimum distance
D position deviation
i counter variable
KS target contour
KM actual contour
M measurement point
P intersection point
R measuring direction
S1 . . . S11 method step
U transition point

The invention claimed is:

1. A method for measuring the contour of a workpiece comprising a first contour geometry and a second contour geometry and a first transition point, at which the first and the second contour geometry adjoin one another tangentially, the method comprising:
   (a) measuring with a contour meter's sensor a plurality of measurement points along the first contour geometry and the second contour geometry,
   (b) determining with a control device based at least in part on information from the sensor regarding the plurality of measurement points a first replacement element for the first contour geometry using at least one measurement point from the first contour geometry,
   (c) determining with the control device based at least in part on information from the sensor regarding the plurality of measurement points a second replacement element for the second contour geometry using at least one measurement point from the second contour geometry,
   (d) calculating one or both of the position and the size of one or both of the first replacement element and the second replacement element using a calculation requirement that the first replacement element and the second replacement element adjoin one another tangentially at a replacement element transition point,
   (e) determining the position of the replacement element transition point at which the first replacement element and the second replacement element adjoin one another tangentially,
   iteratively repeating the steps (b) to (e) using other or additional measurement points for determining one or both of the first replacement element and the second replacement element and using only measurement points having at least a minimum distance from the replacement element transition point used when performing the calculating step,
   wherein the minimum distance is variable and reduced during iterative calculations of a respective transition point.

2. The method according to claim 1, wherein the iteratively repeating the steps (b) to (e) using other or additional measurement points for determining one or both of the first replacement element and the second replacement element is performed until a position change between two consecutive position determinations of the first transition point is smaller than a predetermined predefined threshold value.

3. The method according to claim 1,
   characterized in that the workpiece, which is to be measured, encompasses a third contour geometry, which adjoins the second contour geometry at a second transition point, wherein the connection to the second transition point is to run tangentially, wherein the step (d) further comprises calculating one or both of the position and the size of the third replacement element wherein the calculation requirement further requires that the first and the second replacement element as well as the second and the third replacement element adjoin one another tangentially, respectively.

4. The method according to claim 1,
characterized in that a circle is assigned to one or both of the first contour geometry and the second contour geometry, which extends along a circular arc, as the first replacement element or the second replacement element, respectively.

5. The method according to claim 4,
characterized in that at least three measurement points of the first contour geometry or the second contour geometry are measured to determine the circle as the first replacement element or the second replacement element, respectively.

6. The method according to claim 1,
characterized in that a straight line is assigned to a contour geometry, which extends in a straight line, as a replacement element.

7. The method according to claim 6,
characterized in that, to determine the straight line as auxiliary geometry element, at least three measurement points of the assigned contour geometry are measured.

8. The method according to claim 1, further comprising determining a target contour using the determined replacement elements after the determination of the transition point.

9. The method according to claim 8,
characterized in that the deviation between the measurement points and the target contour is determined.

10. The method according to claim 8, further comprising displaying graphically on a display device the target contour and the actual contour, which results from the measurement points, of the workpiece.

11. A contour meter for measuring the contour of a workpiece comprising a first contour geometry, a second contour geometry, and a first transition point at which the first contour geometry and the second contour geometry adjoin one another tangentially, the meter comprising:
a sensor configured to measure a plurality of measurement points along the contour, which is to be measured, of the workpiece,
a control device configured to execute steps comprising:
(a) determining a plurality of measurement points along the first contour geometry and the second contour geometry based at least in part on information from the sensor regarding the plurality of measurement points,
(b) determining a first replacement element for the first contour geometry using at least one measurement point from the first contour geometry,
(c) determining a second replacement element for the second contour geometry using at least one measurement point from the second contour geometry,
(d) calculating one or both of position and size of one or both of the first replacement element and second replacement element such that the first replacement element and the second replacement element adjoin one another tangentially at a replacement element transition point,
(e) determining the position of the replacement element transition point at which the first replacement element and the second replacement element adjoin one another tangentially,
iteratively repeating the steps (b) to (e) using other or additional measurement points for determining one or both of the first replacement element and the second replacement element and using only measurement points having at least a minimum distance from the replacement element transition point used when performing the calculating step,
wherein the minimum distance is variable and reduced during iterative calculations of a respective transition point.

12. The contour meter according to claim 11, wherein the control device is configured to iteratively repeat the steps (b) to (e) using other or additional measurement points to determine one or both of the first replacement element and the second replacement element, until position change between two consecutive position determinations of the first transition point is smaller than a predetermined predefined threshold value.

13. The contour meter according to claim 11, wherein the sensor comprises a tactile or optical measuring sensor, which can be moved along the workpiece contour to be measured.

* * * * *